Dec. 21, 1965  L. M. GRESHAM  3,224,294
LEFT FOOT ACCELERATOR STRUCTURE
Filed Nov. 29, 1963

*INVENTOR.*
LEE M. GRESHAM
BY
ATTORNEY

United States Patent Office 3,224,294
Patented Dec. 21, 1965

3,224,294
LEFT FOOT ACCELERATOR STRUCTURE
Lee M. Gresham, Detroit, Mich., assignor to Rutha Mae Gresham, d.b.a. Gresham Driving Aids, Detroit, Mich.
Filed Nov. 29, 1963, Ser. No. 326,664
6 Claims. (Cl. 74—562.5)

This invention relates to a left foot accelerator structure for an automobile and more particularly to such an accelerator having a combination of members cooperatively associated for use by either the left or the right foot.

The invention involves the combination of a left foot accelerator structure in which an accelerator pedal secured to an automobile floor is engageable with and easily disengageable from a cross-shaft that operates the conventional accelerator throttle rod. In fact, the left foot accelerator pedal can be pivoted back from its normally operative position to an inoperative position on the floor of the automobile and out of the way of a driver using only his right foot for acceleration and braking. The structure is also provided with a shaft arm that engages the accelerator throttle rod instead of and out of contact with the right foot accelerator pedal itself, thereby enabling a driver to engage and operate the right foot accelerator without interference, in a conventional and safe manner.

It is an object of the invention to provide a left foot accelerator structure that has a left foot accelerator pivotable into and freely out of operative engagement with a cross-shaft rotatably secured to an automobile floor. Another object is to provide a left foot accelerator that is pivotally mounted for rotation into a rest position upon the automobile floor. Yet another object is to provide a shaft arm engageable with the accelerator throttle rod and not with the right foot accelerator pedal itself. A further object is to provide a left foot accelerator structure that will permit free use of either left foot or right foot acceleration by contact with pedals that are free of any mechanical interference with the driver's foot.

These and additional objects of the invention and features of construction will become more clearly apparent from the description given below, in which the terms employed are used for purposes of description and not of limitation.

Reference is made to the drawing annexed hereto forming an integral part of this specification and in which.

Figure 1:
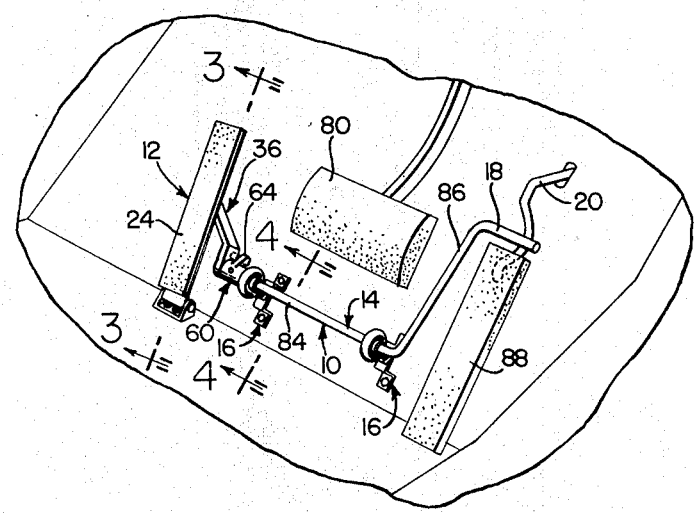
FIGURE 1 is a perspective view of an embodiment of the inventive concept.
Figure 3:
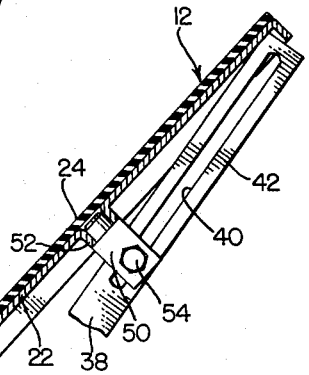
Figure 4:
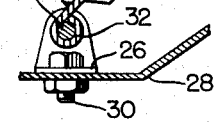
Figure 4:
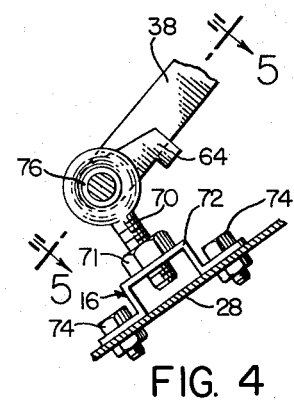

FIGURES 3 and 4 are vertical views taken substantially on the lines 3—3 and 4—4 of FIGURE 1.

Figure 5:
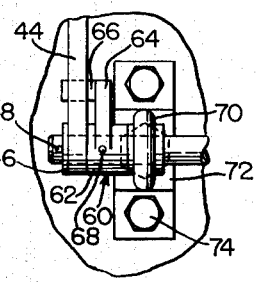

FIGURE 5 is a fragmentary top plan view of the left foot accelerator mechanism at the shaft.

Figure 6:
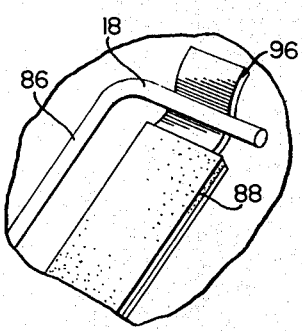

FIGURE 6 is a fragmentary perspective view of the right foot accelerator modified to accommodate the shaft arm in the event that the accelerator throttle rod is arranged in a manner subsantially other than that illustrated in FIGURE 1.

As shown in the several views of the drawing, the left foot accelerator structure 10 comprises a left foot accelerator 12, a cross-shaft 14, floor mounted bracket assemblies 16, 16 for the cross-shaft, and a shaft arm 18 engageable with the accelerator throttle rod 20 provided in the automobile.

The left foot accelerator 12 comprises a pedal base 22 overlaid with a resilient layer 24 of rubber, vinyl or other suitable material, a mounting bracket 26 secured to a floor plate 28 by screws 30, or other suitable fasteners. The pedal base is provided at its lower end with a transverse tubular portion 32 through which a pivot pin 34 can be passed for mounting the pedal to the bracket 26. An accelerator lever 36 having a body 38, a slot 40 extending longitudinally of the upper portion 42 of the lever and an offset lower portion 44, is pivotally secured at its lower portion to the cross-shaft 14 adjacent a washer 46 by a pin 48 passed through the cross-shaft. A clevis 50 is secured to the pedal base 22 at the projection 52, and a pin or screw 54 is passed through the clevis and the lever slot 40 securing the lever and pedal in operative association.

A crank arm 60 having a hub 62, a lever 64 and an arm projection 66 is fixedly secured onto the cross-shaft 14 between the lever 36 and a bracket assembly 16 by a pin 68, whereby the lever 36 is held in a rotatable non-shifting position upon the cross-shaft. The arm projection 66 is extended and disposed for engagement by the lever portion 44.

The mounting bracket assemblies 16, 16 each comprise an eye-bolt 70 threadedly secured by a nut 71 to a bracket 72 mounted on the floor plate 28 with screws 74, or other suitable fasteners, and a shaft bearing 76 disposed in the eye of the bolt 70. The assemblies 16, 16 are mounted in parallel spaced apart positions below the automobile brake pedal 80.

The cross-shaft 14 comprises a first portion 84, rotatably supported on the assemblies 16, 16 mounting the crank arm 60, the accelerator lever 36 and the washer 46 outboard of the left hand assembly 16 and adjacent the left foot accelerator 12, a lever portion 86 extending substantially parallel and adjacent the right foot accelerator 88 pivotally mounted on the floor plate, and the shaft arm 18 which extends from portion 86 over and into engagement with the accelerator throttle rod 20. The right foot accelerator 88 is pivotally mounted at its lower end to the floor plate 28 in any conventional manner.

A slight modification of the structural combination involves the right foot accelerator 88, FIGURE 6. In certain automobile accelerator structures, the throttle rod does not extend upwardly from the upper end of the pedal as shown in FIGURE 1, but rather extends downwardly through a lower opening in the fire wall or floor plate of the automobile. In such arrangement, an offset plate member 96 is secured to the right foot accelerator pedal at its upper end, extending in a configuration and attitude comparable to that of the throttle rod 20. Such plate member 96 is preferably secured to the underside of the pedal, leaving the top surface free for contact entirely by the driver's foot without any interference by the structure 10 or any part thereof.

In operation, the left foot accelerator 12 is normally disposed for use in such a manner that the lever 36 has its lower portion in bearing contact upon the crank arm projection 66. The shaft arm 18 is normally at rest upon and engaged with the throttle rod 20 (or pedal plate 96, FIGURE 6). Shaft portion 84 is long enough to span the width of the brake pedal 80 and beyond to free the brake for driver engagement without interference by the left foot accelerator 12, the lever 36 or the shaft lever portion 86.

As the left foot accelerator pedal 22 is depressed by the driver's foot, lever 36 engages crank arm projection 66 and shaft 14 is rotated, causing the throttle rod 20 to move as if the right foot accelerator 88 had been depressed. Most throttle rods are normally biased by a spring or other resilient device for retraction to a normal at rest position. Upon release of pressure against the left foot accelerator 12, the pedal is pivoted back to its normal position (FIGURE 1) by the action of the throttle rod operating against the shaft arm 18, or by a spring in the right foot accelerator 88, or by some other means associated with the throttle rod or the accelerator 88. Of course, if desired or necessary, a resilient means to retract the left foot accelerator 12 could be associately conjoined with such accelerator.

Figure 2:
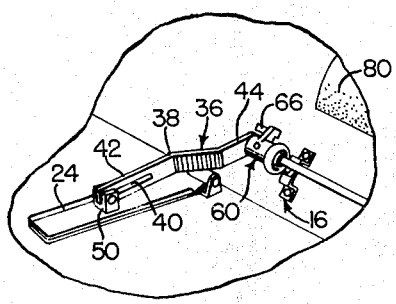
FIGURE 2 is a perspective view of the left foot accelerator in a pivoted floor adjacent position.

In the event that a driver desires to operate the vehicle with only right foot acceleration, the left foot accelerator 12 can be rotated to floor position merely by pivoting the pedal 22 on its pin 34 so that the pedal assumes the position shown in FIGURE 2, out of the way of the driver's left foot.

The left foot accelerator structure 10 is relatively economical and embodies features that easily adapt the structure to current accelerator throttle construction without any modification of such construction in most instances, or with only a very slight modification (FIGURE 6) in one or two instances.

The pedal base 22 is preferably fabricated as a metal stamping, but it can also be a casting. The lever 36, cross-shaft 14, crank arm 60, bracket assemblies 16 and plate member 96 are all preferably made of metal.

Having described the invention in its simplest terms, it is to be understood that the features of construction can be changed and varied in greater or lesser degree without departing from the essence of the invention defined in the appended claims.

I claim:
1. In a left foot accelerator structure,
a left foot accelerator pedal pivotally mounted for rotative movement,
a cross-shaft mounted for rotative movement and having one end thereof extending to a point adjacent said pedal,
a first lever secured to said cross-shaft adjacent said one end,
a second lever rotatably mounted on said cross-shaft adjacent said first lever and adapted to engage with and disengage from said first lever,
    said second lever being movably secured to said accelerator pedal,
    said pedal being rotatable into and out of a cross-shaft operating position,
said cross-shaft terminating at its other end in a lever having an arm portion extending therefrom and adapted to engage accelerator throttle means,
whereby when said left foot accelerator pedal is depressed said cross-shaft arm portion engages and operates said throttle means.

2. In a left foot accelerator structure,
a left foot accelerator pedal pivotally mounted for rotative movement,
a cross-shaft mounted for rotative movement and having one end thereof extending to a point adjacent said pedal,
a first lever secured to said cross-shaft adjacent said one end and having an arm extending laterally of said lever,
a second lever rotatably mounted on said cross-shaft adjacent said first lever and adapted to engage with and disengage from said first lever arm,
    said second lever being slidably secured to said accelerator pedal,
    said pedal being rotatable into and out of a cross-shaft operating position,
said cross-shaft terminating at its other end in a lever having an arm portion extending therefrom and adapted to engage accelerator throttle means,
whereby when said left foot accelerator pedal is depressed said cross-shaft arm portion engages and operates said throttle means.

3. In a left foot accelerator structure,
a left foot accelerator pedal,
a mount for said pedal securing said pedal for pivoting movement thereon,
a cross-shaft having one end thereof extending to a point adjacent said pedal and mount,
bearing assemblies mounting said cross-shaft for rotative movement,
a first lever secured to said cross-shaft adjacent said one end and having an arm extending laterally of said lever,
a second lever rotatably mounted on said cross-shaft adjacent said first lever and adapted to engage with and disengage from said first lever arm,
    said second lever being slidably secured to said accelerator pedal,
    said pedal being rotatable into and out of a cross-shaft operating position,
said cross-shaft terminating at its other end in a lever having an arm portion extending outwardly therefrom and adapted to engage accelerator throttle means,
whereby when said left foot accelerator pedal is depressed said cross-shaft arm portion engages and operates said throttle means.

4. The structure defined in claim 3, and in which said accelerator throttle means comprises a throttle rod.

5. The structure defined in claim 3, and in which said accelerator throttle means comprises
a right foot accelerator pedal having an extension member secured thereto,
    said arm portion adapted to overlie and engage said extension member,
and a throttle rod associatedly connected to said right foot accelerator pedal.

6. In a left foot accelerator structure,
a left foot accelerator pedal,
a mount for said accelerator pedal,
    said mount securing said pedal for pivoting movement thereon, said mount adapted to be secured to an automobile floor adjacent and laterally of a brake pedal,
a cross-shaft rotatably mounted on said automobile floor and forward of said brake pedal,
    one end of said cross-shaft extending to a point adjacent said pedal and mount,
bearing assemblies mounting said cross-shaft for rotative movement and adapted to be secured to said automobile floor,
a crank arm secured to said cross-shaft adjacent said one end and having an arm projection thereon extending in the general direction of said pedal, a lever pivotally mounted on said cross-shaft adjacent said crank arm and adapted to engage with and disengage from said crank arm projection,
    said lever being slidably secured to said accelerator pedal,
said cross-shaft terminating at its other end in a lever portion having an extended arm portion adapted to engage accelerator throttle means,
whereby when said left foot accelerator pedal is depressed said cross-shaft arm portion engages and operates said throttle means.

References Cited by the Examiner

UNITED STATES PATENTS

| | | | |
|---|---|---|---|
| 1,261,425 | 4/1918 | Murphy | 74—562.5 |
| 2,302,436 | 11/1942 | Felton | 74—562.5 |
| 2,427,269 | 9/1947 | Forssell | 74—562.5 |
| 2,942,493 | 6/1960 | Barth | 74—562.5 |

FOREIGN PATENTS 918,486   9/1954   Germany.

BROUGHTON G. DURHAM, *Primary Examiner.*

C. F. GREEN, *Assistant Examiner.*